Figure 1:
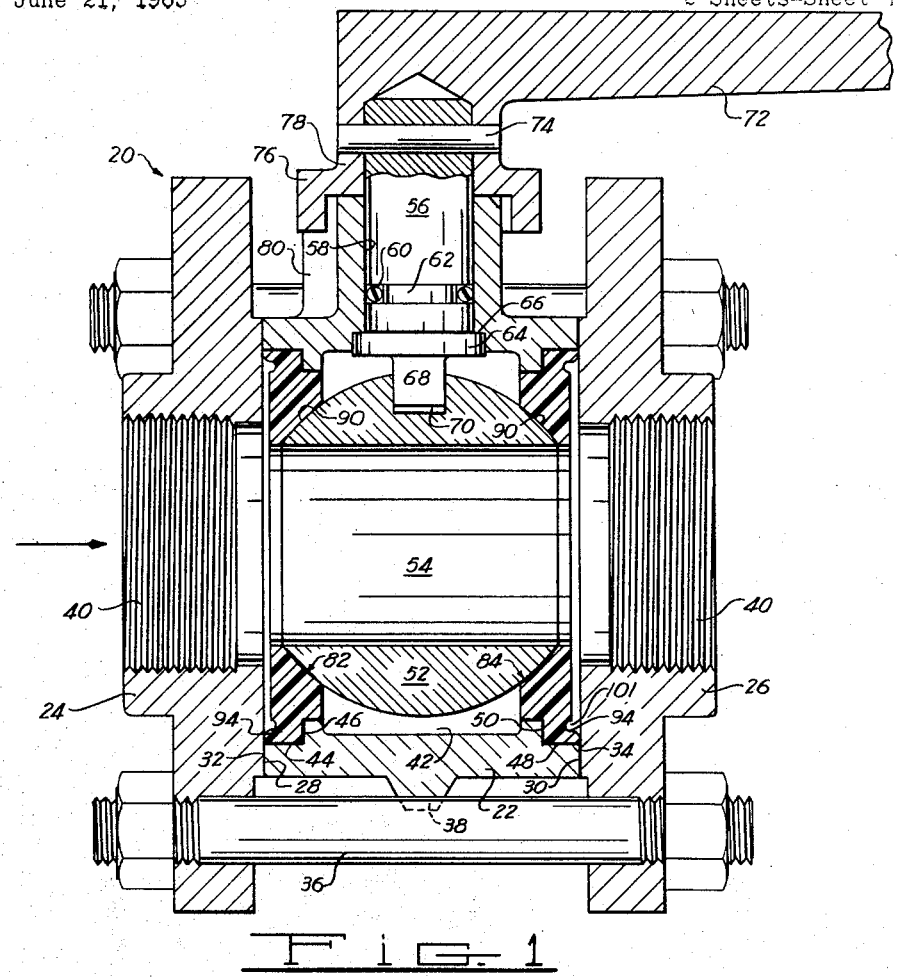

Sept. 5, 1967   D. SCARAMUCCI   3,339,885
BALL VALVE AND UNSTRESSED SYNTHETIC RESIN SEALS THEREFOR
Filed June 21, 1965   2 Sheets-Sheet 1

INVENTOR.
DOMER SCARAMUCCI
BY
Dunlap and Laney
ATTORNEYS

Sept. 5, 1967          D. SCARAMUCCI          3,339,885
BALL VALVE AND UNSTRESSED SYNTHETIC RESIN SEALS THEREFOR
Filed June 21, 1965          2 Sheets-Sheet 2
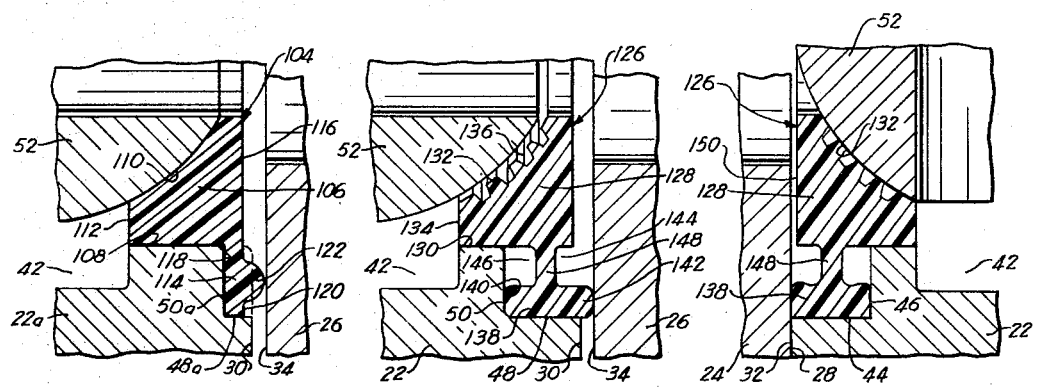
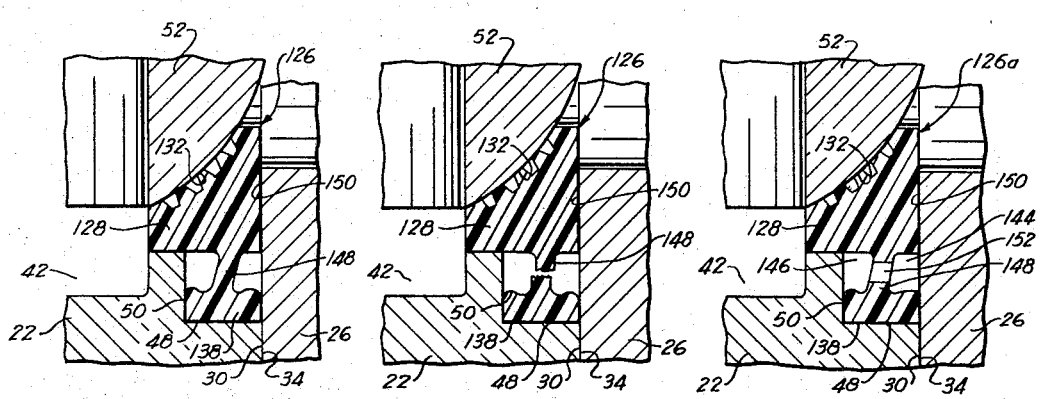
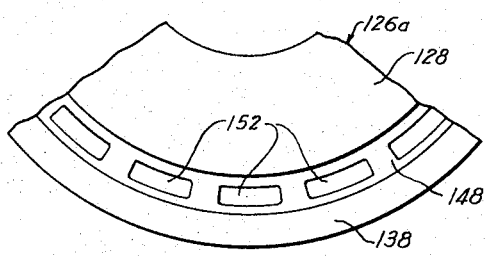
INVENTOR.
DOMER SCARAMUCCI
BY
*Dunlap and Laney*
ATTORNEYS United States Patent Office 3,339,885
Patented Sept. 5, 1967

3,339,885
BALL VALVE AND UNSTRESSED SYNTHETIC
RESIN SEALS THEREFOR
Domer Scaramucci, 3245 S. Hattie, Oklahoma City,
Okla. 73129
Filed June 21, 1965, Ser. No. 465,365
17 Claims. (Cl. 251—172)

This invention relates generally to improvements in ball valves, and more particularly, but not by way of limitation, to improved ball valve seals.

As is well known in the art, ball valves have been historically provided with seals in one or both ends thereof to seal against the leakage of fluid through the valve when the valve ball is turned to a closed position. Such seals have taken various shapes and have been formed of various types of materials, such as rubber, rubber compounds, and synthetic resin materials. Rubber and rubber compound seals, being normally relatively soft, have ordinarily not been found suitable for high pressure service unless combined with rigid reinforcing rings and the like which materially increases the cost of the valve. Synthetic resin seals have been used, particularly in high pressure service, but in order to perform their sealing actions have normally been wedged between the valve ball and the valve body in all operating positions of the valve ball in order to maintain an efficient sealing action. When the seals are wedged between the valve ball and valve body, the valve ball is normally very difficult to turn between its open and closed positions.

The present invention contemplates a novel ball valve construction utilizing one or more novel synthetic resin seals therein wherein the seals are held securely in operating positions but are not wedged between the valve ball and valve body in a manner to interfere with the turning movements of the ball. In use, the novel sealing ring of this invention is clamped to the valve body adjacent its outer periphery and extends generally radially inward from the valve body into sealing engagement with the valve ball and is flexible between its inner and outer peripheries to remain in sealing contact with the ball in all operating positions of the ball. The present sealing ring is a one-piece body of synthetic resin material and normally remains in sealing engagement with the valve ball for use in both high and low pressure service, but is particularly suited for high pressure service. Basically, the present sealing ring comprises an annular body of synthetic resin material having a shaped ball-engaging surface and an outer, circumferential, flexible flange portion shaped to be clamped between the valve body and a tubular connector secured to the adjacent end of the valve body in such a manner that the clamping action does not distort the sealing ring main body portion and does not wedge the sealing ring against the valve ball.

One object of the invention is to provide a ball valve construction wherein the valve ball will be effectively sealed in the valve body and yet will not be unduly restricted in its opening and closing movements.

Another object of this invention is to provide a ball valve construction wherein the seals may be easily replaced without the necessity of removing the ball from the valve body.

Another object of this invention is to provide a synthetic resin sealing ring for a ball valve which effectively performs its sealing function without the necessity of being wedged between the valve ball and valve body.

A further object of this invention is to provide a synthetic resin sealing ring for a ball valve which is responsive to pressure differentials across the valve for increasing the sealing function of the esal.

Another object of this invention is to provide a novel one-piece synthetic resin sealing ring which will function as either an upstream or a downstream seal.

A still further object of this invention is to provide a ball valve which is simple in construction, requires a minimum of precision in its manufacture and which will have a long service life.

Other objects and advantages of the invention will be evident from the following detailed description when read in conjunction with accompanying drawings which illustrate the invention.

Figure 2:
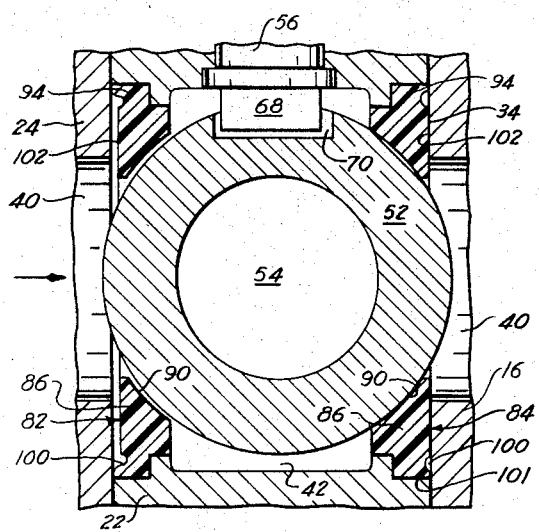
Figure 3:
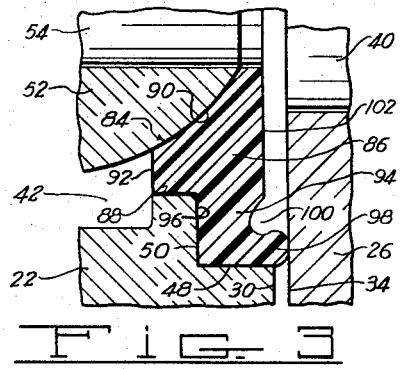

In the drawings:
FIG. 1 is a vertical sectional view through a ball valve constructed in accordance with this invention.
FIG. 2 is a view similar to a portion of FIG. 1, illustrating the valve ball in a closed position and with a pressure differential existing across the valve.
FIG. 3 is an enlarged, exploded view of a portion of the sealing ring construction and cooperating parts of the valve body as utilized in the valve of FIGS. 1 and 2.
FIG. 4 is a view similar to FIG. 3 illustrating a modified sealing ring construction.
FIG. 5 is another view similar to FIG. 3 illustrating still another modified sealing ring construction.
FIG. 6 is an enlarged vertical sectional view through a portion of the upstream end of a valve showing the action of the FIG. 5 sealing ring.
FIG. 7 is an enlarged vertical sectional view of a portion of the downstream end of a valve showing the operation of the FIG. 5 sealing ring when used as a downstream sealer.
FIG. 8 is a view similar to FIG. 7 illustrating the continued functioning of the FIG. 5 sealing ring even upon partial failure of the sealing ring.
FIG. 9 is a view similar to FIG. 7 illustrating a slightly modified sealing ring.
FIG. 10 is a partial end elevational view of the FIG. 9 sealing ring.

Referring to the drawings in detail, and particularly FIG. 1, reference character 20 generally designates a ball valve which includes a valve body 22 and upstream and downstream connectors 24 and 26, respectively. The upstream end 28 and the downstream end 30 of the body 22 are both shaped substantially flat to mate with the flat inner ends 32 and 34 of the connectors 24 and 26, respectively. The connectors 24 and 26 are clamped against the opposite ends of the valve body by a plurality of circumferential bolts 36 and the bolts 36 may, if desired, extend through circumferentially spaced grooves 38 formed in the outer periphery of the valve body 22 to maintain the connectors 24 and 26 centered with respect to the valve body during the asembly of the valve. It will be observed in FIG. 1 that the connectors 24 and 26 are in the form of standard pipe flanges wherein each connector has a partially threaded bore 40 extending therethrough for connection with adjacent sections of a pipe line (not shown) and to form the inlet and outlet for the valve 20.

The valve body 22 is provided with the usual valve chamber 42 therein extending between the upstream and downstream ends of the body and the central portion of the valve chamber 42 may be enlarged as illustrated in FIG. 1. A counterbore 44 is formed in the upstream end of the valve chamber 42 providing a circumferential shoulder 46 facing the upstream end 28 of the valve body, and a similar counterbore 48 is formed in the downstream end of the valve chamber providing a circumferential shoulder 50 facing the downstream end 30 of the valve body, for purposes to be described. It may also be noted in FIG. 1 that the diameters of the counterbores 44 and 48 are substantially larger than the diameters of the bores 40 extending through the connectors 24 and 26.

The usual valve ball 52, having a port 54 therethrough, is positioned in the valve chamber 42 and is turned to its open and closed positions through the medium of a valve stem 56. The valve stem 56 extends through an aperture 58 formed in the top of the valve body 22 and is sealed in the aperture 58 by means of a suitable sealing ring 60 mounted in a mating groove 62 formed in the outer periphery of the valve stem. A circumferential flange 64 is formed around the valve stem 56 and is sized to mate with a flat shoulder 66 in the valve body 22 to prevent inadvertent removal of the valve stem from the body. The inner end portion 68 of the valve stem 56 is rectangular in cross section and slidingly fits in an elongated groove 70 formed in the outer surface of the ball 52. As shown most clearly in FIG. 2, the groove or slot 70 in the valve ball 52 is longer than the transverse length of the valve stem end portion 68, whereby the ball 52 may move upstream and downstream in the valve chamber 42 when the ball is in a closed position, as will be more fully hereinafter set forth. The outer end of the valve stem 56 is connected to a suitable handle 72 by a pin or the like 74 for manual turning of the ball 52. One or more lugs 76 are formed on the handle hub portion 78 to mate with corresponding projections 80 on the valve body 22 to limit the turning movement of the ball 52 to approximately 90° in the usual fashion.

Novel upstream and downstream sealing rings 82 and 84 are positioned in the respective upstream and downstream ends of the valve chamber 42. The sealing rings 82 and 84 are constructed in the same manner. Thus, it will only be necessary to describe the downstream sealing ring 84 in detail, and such structure is best described with reference to FIG. 3 wherein the sealing ring 84 is shown enlarged and in its relaxed condition prior to connection of the downstream connector 26 to the downstream end 30 of the valve body 22.

As shown in FIG. 3, the sealing ring 84 comprises an annular body 86 of a synthetic resin material, such as nylon, Teflon or Delrin, having an outer periphery 88 of a size to provide a sliding fit of the sealing ring in the valve chamber 42. A ball-engaging surface 90 is formed on the body 86 between the inner end 92 and the inner periphery of the body. In this form of the invention, the ball-engaging surface 90 is curved in conformity with the curvature of the outer surface of the ball 52 to provide an efficient seal of the body 86 to the valve ball when the ball-engaging surface 90 is in contact with the ball.

A circumferential flange 94 is formed around the outer periphery of the body 86 and extends into the respective counterbore 48. The outer diameter of the flange 94 is of a size to provide a sliding fit of the flange in the counterbore 48 in the relaxed condition of the sealing ring 84, and the inner end 96 of the flange 94 is preferably flat to mate with the circumferential shoulder 50. An annular bead 98 is formed on the outer end of the flange 94 and, in the relaxed condition of the sealing ring 84, the bead 98 projects beyond the downstream end 30 of the body 22 as illustrated in FIG. 3. An annular relief groove 100 is formed in the outer end of the flange 94 immediately inwardly of the bead 98 and at least partially in axial alignment with the circumferential shoulder 50. Thus, when the connector 26 is secured against the downstream end 30 of the body 22, the annular bead 98 will be distorted and a volume of synthetic resin material substantially corresponding to that portion of the bead 98 projecting beyond the downstream body face 30 will be moved into the relief groove 100, whereby the flange 94 will be easily distorted and clamped in the counterbore 48 without disturbing the position of the body portion 86. It will also thus be noted that when the connector 26 is secured against the downstream body end 30, the connector 26 forms, with the counterbore 48, an annular groove 101 (see FIGS. 1 and 2) opening into the valve chamber 42, and that the overall axial length of the flange 94, in the relaxed condition of the flange, is greater than this annular groove, whereby the flange 94 will be effectively clamped in the counterbore 48 and provide an effective seal between the valve body 22 and the connector 26. On the other hand, it should be noted that the relief groove 100 is of such a size as not to be wholly filled with the synthetic resin material when the connector 26 is secured to the downstream body end 30, as illustrated both in FIGS. 1 and 2, whereby the clamping of the flange 94 will not distort material into the body portion 86 and alter the position of the body portion 86. It should further be noted in FIG. 3 that the outer end 102 of the body portion 86 is spaced inwardly from the downstream body end 30 to provide a space between the body portion 86 and the connector 26 when the connector is secured to the valve body, for purposes to be described.

As previously stated, the upstream sealing ring 82 is constructed in the same manner as the downstream sealing ring 84 and, therefore, the structural portions of the sealing ring 82 have been given the same reference numbers as the corresponding structural portions of the downstream sealing ring 84.

When the valve 20 is assembled and the ball 52 is in an open position as shown in FIG. 1, the ball 52 will be centered in the valve chamber 42 and the ball-engaging surfaces 90 of both of the sealing rings 82 and 84 will be in engagement with the outer surface of the valve ball. It may also be noted that the flange portion 94 of each of the sealing rings 82 and 84 will be clamped in the respective counterbore 44 or 48 and provide an effective seal between the valve body 22 and the respective connector 24 or 26 to prevent leakage of fluid from the valve chamber 42.

When the ball 52 is turned to a closed position, and an appreciable pressure differential exists between the upstream and downstream ends of the valve, the valve ball 52 will be shifted downstream by the action of the upstream pressure as illustrated in FIG. 2. The ball 52 thus moves the main body portion 86 of the downstream sealing ring 84 downstream until the outer end 102 of the body portion 86 engages the inner end 34 of the downstream connector 26. It will then be apparent that the ball-engaging surface 90 of the downstream seal 84 will remain in sealing engagement with the ball 52 and the downstream seal 84 will effectively prevent the leakage of fluid either around the ball 52 or around the seal 84.

When the valve is closed and a pressure differential exists across the valve, the upstream pressure will also be active on the outer end face 102 of the upstream sealing ring 82 and tend to move the body portion 86 of the upstream sealing ring further into the valve chamber 42 with the movement of the ball 52. Depending upon the relative size and flexibility of the upstream sealing ring 82, the ball-engaging surface 90 thereof may or may not remain in engagement with the ball 52. If the upstream sealing ring 82 is sufficiently flexible to follow the movement of the ball 52, the sealing ring 82 will remain effective as an upstream seal for the valve 20. On the other hand, the upstream sealing ring 82 may not be sufficiently flexible to follow the downstream movement of the ball 52 and the ball-engaging surface 90 thereof may be disengaged from the ball 52 as illustrated in FIG. 2. In this event, of course, the upstream sealing ring 82 is not then effective in providing an upstream seal for the valve, and the valve will then be provided only with the downstream seal. In any event, if the pressure in the valve chamber 42 should become excessive and greater than the upstream pressure, the pressure in the valve chamber will be effective to move the main body portion 86 of the upstream seal 82 toward the upstream connector 24 and provide a bypass or leakage of this excess pressure between the sealing ring 82 and the ball 52 back into the upstream side of the valve.

It should also be noted that in low pressure service where no appreciable pressure differential exists across the valve when the valve is closed, the upstream sealing ring 82 will remain in engagement with the ball 52 and provide an effective upstream seal for the valve.

FIG. 4 illustrates a portion of the downstream end of a slightly modified valve body 22a for supporting a modified sealing ring 104. The modified valve body 22a is provided with the usual valve chamber 42 and is provided with a relatively shallow counterbore 48a in the downstream end 30 thereof extending concentrically around the valve chamber 42. The counterbore 48a forms a circumferential shoulder 50a facing the downstream end of the body. The same downstream connector 26 as was used in the previous valve construction is sized to engage the downstream end 30 of the valve body 22a when the valve is assembled.

The modified sealing ring 104 comprises an annular body 106 of synthetic resin material having an outer periphery 108 sized to slidingly fit in the respective end of the valve chamber 42. A ball-engaging surface 110 is formed on the sealing ring body portion 106 between the inner end 112 of the body and the inner periphery of the body to sealingly mate with the adjacent surface of the ball 52 as illustrated in FIG. 4. A circumferential flange 114 is formed around the outer periphery of the body 106 adjacent the outer end 116 of the body in a position to extend into the counterbore 48a when the sealing ring is installed in the valve. The inner end 118 of the flange 114 is substantially flat to mate with the shoulder 50a in the valve body 22a, and the outer periphery of the flange 114 is of a size to slidingly fit in the counterbore 48a in the relaxed condition of the flange. The axial thickness or length of the flange 114 is less than the depth of the counterbore 48a, whereby the outer end 120 of the flange 114, in the relaxed condition of the flange, is positioned inside of the counterbore 48a. However, an annular bead 122 is formed on the outer end 120 of the flange 114 and is of a size to protrude beyond the downstream end face 30 of the valve body 22a in the relaxed condition of the sealing ring as illustrated in FIG. 4. It may be noted here that the radial width of the bead 122 is substantially less than the radial width of the counterbore 48a. Therefore, when the tubular connector 26 is secured against the downstream end 30 of the valve body 22a, the bead 122 can be distorted into the counterbore 48a, as illustated by the dashed lines in FIG. 4, without displacing any material from the flange 114 into the main body portion 106 of the sealing ring 104. Thus, the position of the main body portion 106 of the sealing ring is not changed by the clamping of the tubular connector 26 to the valve body 22a.

It will be appreciated that the sealing ring 104 may be used on either the upstream or downstream end of a ball valve, or, of course, at both ends of a ball valve. The operation of the sealing ring 104 is the same as the operation of the sealing rings 82 and 84 previously described, depending upon whether the sealing ring 104 is used as an upstream seal or downstream seal. Thus, it will not be necessary to set forth a detailed operation of the sealing ring 104.

Another modified sealing ring 126 is illustrated in FIG. 5 and is sized for use in the ball valve 20 previously described in detail. The sealing ring 126 is illustrated in FIG. 5 in the position to form a downstream seal, although it will be understood that the sealing ring 126 may also be used as an upstream seal. The sealing ring 126 comprises an annular shaped body portion 128 of a synthetic resin material having an outer periphery 130 of a size to provide a sliding fit of the ring in the respective end of the valve chamber 42. The ball-engaging surface 132 of the sealing ring 126 is formed between the inner end 134 and the inner periphery of the body portion 128 and is curved to mate with the adjacent surface of the ball 52. In this embodiment, however, a plurality of annular grooves 136 are formed in the ball-engaging surface 132 to provide a series of lands which engage the ball 52 and provide an improved sealing action.

A flexible, circumferential flange 138 is formed on the outer periphery 130 of the body portion 128 in a position to extend into the respective counterbore 48 in the valve body 22. A portion 140 of the inner end of the flange 138 engages the circumferential body shoulder 50, and the outer periphery of the flange 138 slidingly fits in the counterbore 48 in the relaxed condition of the flange as illustrated in FIG. 5. Also, in the relaxed condition of the flange 138, the outer end 142 of the flange protrudes beyond the downstream end face 30 of the valve body 22 into the path of movement of the downstream connecter 26, as will be described. An annular relief groove 144 is formed in the outer end 142 of the flange 138 extending from the outer periphery 130 of the main body portion 128 outwardly over a portion of the radial length of the flange 138. A corresponding annular relief groove 146 is formed in the inner end 140 of the flange 138, thus forming a web portion 148 between the radially outer enlarged portion of the flange and the sealing ring main body portion 128. Therefore, when the connector 26 is secured against the downstream end 30 of the valve body 22, the radially outer enlarged portion of the flange 138 will be deformed partially into the relief grooves 144 and 146 and no material from the flange 138 will be displaced into the main body portion 128 of the seal 126. The web portion 148 increases the flexibility of the flange 138 and facilitates the upstream and downstream movements of the main body portion 128 of the sealing ring upon the application of forces and pressures, as will be described.

When the sealing ring 126 is used as an upstream seal, as illustrated in FIG. 6, the upstream fluid pressure will act on the outer end 150 of the sealing ring main body portion 128 and continually urge the ball-engaging surface 132 of the sealing ring against the ball 52. Thus, even when the ball 52 is closed and is moved downstream by a differential pressure as previously described, the main body portion 128 of the sealing ring 126 will follow the downstream movement of the ball and maintain an upstream seal for the valve. The flexible web portion 148 of the flange 138 facilitates this axial movement of the body portion 128 in the valve chamber 42.

When the sealing ring 126 is used as a downstream seal, as illustrated in FIG. 7, the main body portion 128 of the sealing ring will be moved downstream with the ball 52 when the ball is closed until the outer end 150 of the sealing ring engages the end 34 of the downstream connector 26. It will then be apparent that the ball-engaging surface 132 of the sealing ring 126 will remain in sealing engagement with the adjacent surface of the ball 52. It will also be noted that in this condition of the sealing ring 126, the web portion 148 of the flange 132 will be bent or flexed to accommodate the downstream movement of the body portion 128. Under extremely high pressure service conditions, the flange web portion 148 may be bent sufficiently and exposed to a sufficient pressure differential to rupture as illustrated in FIG. 8. However, even under these circumstances, the ball-engaging surface 132 of the body portion 128 will remain in sealing engagement with the ball 52, and the outer end 150 of the body portion 128 will be pressed tightly against the end 34 of the downstream connector 26 to provide an effective seal between the ball 52 and the downstream connector 26. Also, the radially outer enlarged portion of the flange 138 will remain in position in the counterbore 48 in sealing engagement with the shoulder 50 and the end 34 of the downstream connector 26 to effectively prevent the leakage of fluid between the downstream end 30 of the valve body 22 and the downstream connector 26.

In view of the fact that the sealing ring 126 will remain as an effective downstream seal in the event of rupture of the web portion 148, the sealing ring may be modified as illustrated at 126a in FIG. 9. The sealing ring 126a is constructed in the same manner as the sealing ring 126 previously described, except that the sealing ring 126a is provided with a plurality of apertures 152 (see also FIG. 10) in the web portion 148 of flange 138. The provision of the apertures 152 increases the flexibility of the web portion 148 and yet do not interfere with the efficient operation of the sealing ring as a downstream seal. The enlarged radial outer portion of the flange 138 remains in sealing engagement with the body shoulder 50 and the downstream connector 26 in the same manner as previously described to prevent the leakage of fluid between the valve body and the connector 26. The increased flexibility of the web portion 148 assures that the body portion 128 of the sealing ring will be moved downstream into engagement with the inner end 34 of the connector 26 when the ball 52 is closed as shown in FIG. 9, whereby the body portion 128 provides an effective seal between ball 52 and the connector 26 to prevent a leakage of fluid around the body portion 128 of the sealing ring.

From the foregoing it will be apparent that the present invention provides a novel ball valve construction and a novel sealing ring construction wherein the valve is provided with either a downstream seal or both upstream and downstream seals which will be effective in both high and low pressure service if desired. The sealing ring is securely clamped in position in the valve chamber and yet is flexible to readily conform to the upstream and downstream movements of the valve ball while remaining in sealing engagement with the valve ball. It may also be noted that the clamping of the outer peripheral portion or flange portion of the sealing ring between the valve body and the respective tubular connector does not provide distortion of the inner peripheral portion of the sealing ring, such that no appreciable forces are applied to the valve ball by the sealing rings to interfere with the ease of turning of the ball.

Changes may be made in the combination and arrangement of parts or elements as heretofore set forth in the specification and shown in the drawings, it being understood that changes may be made in the embodiments disclosed without departing from the spirit and scope of the invention as defined in the following claims.

What is claimed is:

1. A ball valve, comprising:
   a body having opposite ends, a valve chamber therein extending between said opposite ends, and a counterbore in one end of the valve chamber forming a circumferential shoulder facing the respective end of the body;
   a valve ball mounted in the valve chamber for opening and closing movements;
   a tubular connector adapted to be secured to the end of the body containing said counterbore having an end facing said circumferential shoulder to form, with said counterbore, an annular groove opening into the valve chamber; and
   a synthetic resin sealing ring in the end of the valve chamber containing said counterbore having a ball-engaging surface thereon adjacent the inner periphery thereof and having a circumferential flange on the outer periphery thereof extending into said counterbore, said flange having an axial length, in the relaxed condition thereof, greater than the distance between said shoulder and said end of said connector when said connector is secured to the valve body to be distorted by said connector when said connector is secured to the body, and said flange having a total volume less than the total volume of said annular groove, whereby distortion of said flange does not provide distortion of the sealing ring.

2. A ball valve as defined in claim 1 wherein the ball-engaging surface of said sealing ring is curved to mate with the adjacent surface of the valve ball.

3. A ball valve as defined in claim 2 wherein the ball-engaging surface of said sealing ring has at least one annular groove therein.

4. A ball valve as defined in claim 1 wherein said flange has an outer diameter substantially equal to the diameter of said counterbore and an annular relief groove in the end thereof facing said connector arranged in radially inwardly spaced relation from the outer periphery of said flange to receive material of the flange when the connector is secured to the body.

5. A ball valve as defined in claim 4 wherein said flange also has an annular relief groove in the end thereof facing said circumferential shoulder arranged in radially inwardly spaced relation from the outer periphery of the flange to receive material of the flange when the connector is secured to the body.

6. A ball valve as defined in claim 5 wherein said annular relief grooves formed in said flange are axially aligned and coterminous with the outer periphery of the sealing ring, and wherein that portion of the flange between said annular relief grooves as a plurality of circumferentially spaced apertures therethrough to increase the flexibility of said flange.

7. A ball valve as defined in claim 1 wherein the end of said flange facing said connector, in the relaxed condition of the flange, has an annular bead thereon positioned to be distorted by the connector when the connector is secured to the body.

8. A ball valve, comprising:
   a body having opposite ends, a valve chamber therein extending between said ends, and a counterbore in one end of the valve chamber forming a circumferential shoulder facing the respective end of the body;
   a valve ball mounted in the valve chamber for opening and closing movements;
   a tubular connector adapted to be secured to the end of the body containing said counterbore having an end facing said circumferential shoulder to form, with said counterbore, an annular groove opening into the valve chamber; and
   a synthetic resin sealing ring having an outer diameter of a size to provide a sliding fit thereof in the valve chamber, said sealing ring having a ball-engaging surface thereon adjacent the inner periphery thereof and a flexible circumferential flange on the outer periphery thereof extending into said counterbore, said flange having an axial length, in the relaxed condition thereof, greater than the distance between said shoulder and said end of the connector when the connector is secured to the body to be distorted by the connector when the connector is secured to the body, and said flange having a total volume less than the total volume of said annular groove, whereby distortion of said flange does not provide distortion of the sealing ring.

9. A ball valve, comprising:
   a body having an upstream end and a downstream end, a valve chamber therein extending between said ends, and a counterbore in the downstream end of the valve chamber forming a circumferential shoulder in the valve chamber facing the downstream end of the body;
   a valve ball mounted in the valve chamber for opening and closing movements and for movement toward the downstream end of the body when in a closed position;
   a tubular connector adapted to be secured to the downstream end of the body having an outer diameter greater than said counterbore and an inner diameter less than the diameter of the valve chamber to form, with said counterbore, an annular groove opening into the valve chamber; and
   a synthetic resin sealing ring slidingly fitting in the downstream end of the valve chamber to be moved downstream by the ball when the ball is in a closed position, said sealing ring having a flexible circumferential flange on the outer periphery thereof extending into said counterbore, said flange having an axial length, in the relaxed condition thereof, greater than the distance between said shoulder and the connector when the connector is secured to the downstream end of the body to be distorted by the connector when the connector is secured to the downstream end of the body, and said flange having a total volume less than the total volume of said annular groove, whereby distortion of said flange does not provide distortion of the sealing ring.

10. A ball valve, comprising:

a body having an upstream end and a downstream end, a valve chamber therein between said ends, and a counterbore in each end of the valve chamber;

a valve ball mounted in the valve chamber for opening and closing movements;

tubular connectors adapted to be secured to the opposite ends of the valve body, each of said connectors being sized to form, with the adjacent counterbore, an annular groove opening into the valve chamber; and a synthetic resin sealing ring in each end of the valve chamber having a ball-engaging surface thereon adjacent the inner periphery thereof and a circumferential flange on the outer periphery thereof extending into the respective counterbore, each of said sealing ring flanges having an axial length, in the relaxed condition thereof, greater than the length of the respective annular groove to be distorted by the respective connector when the connector is secured to the respective end of the valve body, and each of said sealing ring flanges having a total volume less than the total volume of the respective annular groove, whereby distortion of said flanges by securing said connectors to the opposite ends of the valve body does not distort said sealing rings against the valve ball.

11. A ball valve, comprising:

a body having an upstream end and a downstream end, a valve chamber therein between said ends, and a counterbore in each end of the valve chamber;

a valve ball mounted in the valve chamber for opening and closing movements and for movement axially in the valve chamber between the upstream and downstream ends of the valve chamber when in a closed position;

tubular connectors adapted to be secured to the opposite ends of the valve body, each of said connectors being sized to form, with the adjacent counterbore, an annular groove opening into the valve chamber; and a synthetic resin sealing ring slidably positioned in each end of the valve chamber having a ball-engaging surface thereon adjacent the inner periphery thereof and a circumferential flexible flange on the outer periphery thereof extending into the respective counterbore, each of said sealing ring flanges having an axial length, in the relaxed condition thereof, greater than the length of the respective annular groove to be distorted by the respective connector when the connector is secured to the respective end of the valve body, and each of said sealing ring flanges having a total volume less than the total volume of the respective annular grooves, whereby distortion of said flanges by securing said connectors to the opposite ends of the valve body does not distort the sealing rings against the valve body.

12. A ball valve sealing ring, comprising:

an annular shaped body of synthetic resin material having:
- an inner end;
- an outer end;
- a ball-engaging face thereon between the inner end and inner periphery thereof; and
- a circumferential flange formed around the outer periphery thereof having an inner end and an outer end, the outer end of said flange having a portion thereof protruding beyond the outer end of said body to be distorted upon assembly in a valve and having an annular relief groove therein positioned to receive the material of the flange displaced by said distortion to prevent distortion of said body.

13. A sealing ring as defined in claim 12 wherein said ball-engaging surface is curved substantially on the arc of a circle.

14. A sealing ring as defined in claim 13 wherein said ball engaging surface has at least one annular groove formed thereon.

15. A sealing ring as defined in claim 12 wherein said relief groove is located radially inward of said protruding portion of said flange.

16. A sealing ring as defined in claim 15 characterized further to include an annular relief groove in the inner end of said flange axially aligned with the relief groove in the outer end of said flange.

17. A sealing ring as defined in claim 16 characterized further to include a plurality of circumferentially spaced apertures in said flange communicating with said relief grooves.

References Cited

UNITED STATES PATENTS

| | | | |
|---|---|---|---|
| 2,631,908 | 3/1953 | Teetor | 277—200 |
| 2,949,325 | 8/1960 | Nenzell | 277—207 |
| 3,056,576 | 10/1962 | Kulisek | 251—315 |

FOREIGN PATENTS

| | | |
|---|---|---|
| 1,018,974 | 10/1952 | France. |
| 843,149 | 8/1960 | Great Britain. |

M. CARY NELSON, *Primary Examiner.*

W. R. CLINE, *Assistant Examiner.*